United States Patent [19]
Sakaki et al.

[11] 4,064,397
[45] Dec. 20, 1977

[54] AUTOMATIC EQUALIZER HAVING A COEFFICIENT MATRIX CIRCUIT

[75] Inventors: Hiroshi Sakaki, Tokyo; Sotokichi Shintani, Mitaka; Hidemi Kuroda, Tokyo, all of Japan

[73] Assignee: Kokusai Denshin Denwa Co. Ltd., Tokyo, Japan

[21] Appl. No.: 699,581

[22] Filed: June 24, 1976

[30] Foreign Application Priority Data
June 24, 1975  Japan ..................... 50-76432

[51] Int. Cl.² .................... G06F 15/34; H04B 3/04
[52] U.S. Cl. ..................... 364/724; 333/18; 333/28 R
[58] Field of Search ............... 235/152, 156; 328/167; 333/18, 28 R, 70 T

[56] References Cited
U.S. PATENT DOCUMENTS

| | | | |
|---|---|---|---|
| 3,697,897 | 10/1972 | Chang | 333/18 |
| 3,715,665 | 2/1973 | Chang | 333/18 X |
| 3,820,042 | 6/1974 | Mueller | 333/18 |
| 3,868,576 | 2/1975 | Bagdasarjanz et al. | 333/18 X |

*Primary Examiner*—Jerry Smith
*Attorney, Agent, or Firm*—Armstrong, Nikaido & Marmelstein

[57] ABSTRACT

In an automatic equalizer for regenerating a received digital signal, comprising a delay element train with a plurality of taps, a coefficient matrix circuit and a group of variable coefficient units, the structure of said coefficient matrix circuit being considerably simplified by introducing a simple adder and/or subtractor at the input and/or the output of said coefficient matrix circuit.

6 Claims, 6 Drawing Figures

AUTOMATIC EQUALIZER HAVING A COEFFICIENT MATRIX CIRCUIT

BACKGROUND OF THE INVENTION

The present invention relates to an automatic equalizer utilized in a digital transmission circuit and, in particular, relates to the improvement of an automatic equalizer having a coefficient matrix.

A prior automatic equalizer having a coefficient matrix for instance, R. W. Chang: A New Equalizer Structure for Fast Start-Up Digital Communication, BSTJ Vol 50 1971 PP1969-1971 has a disadvantage in that the structure of the equalizer is complicated since the prior equalizer computes the whole coefficient matrix. This creates considerable redundancy.

SUMMARY OF THE INVENTION

It is an object, therefore, of the present invention to overcome the disadvantage and limitation of a prior automatic equalizer by providing a new and improved automatic equalizer.

It is also an object of the present invention to provide a new and improved automatic equalizer which reduces the computation steps using the redundancy of the coefficient matrix and simplifies the structure of the apparatus.

The above and other objects are attained by an automatic equalizer comprising a delay element train having a plurality of taps, one end of the train being connected to an input terminal, a coefficient matrix circuit having a symmetrical placement of elements which operate to each signal from each tap of said delay element train, a group of variable coefficient units controlled by said coefficient matrix circuit, for providing an equalized output signal, and an adder and/or a subtractor provided at the output and the input of said coefficient matrix circuit, for adding and/or subtracting a pair of tap outputs from each other said pairs of signals being obtained from output taps of said delay element train.

BRIEF DESCRIPTION OF THE DRAWINGS

The foregoing and other objects, features and attendant advantages of the invention will be appreciated as the same become better understood by means of the following description and the accompanying drawings wherein.

DETAILED DESCRIPTION OF THE PREFERRED EMBODIMENTS

Figure 1:
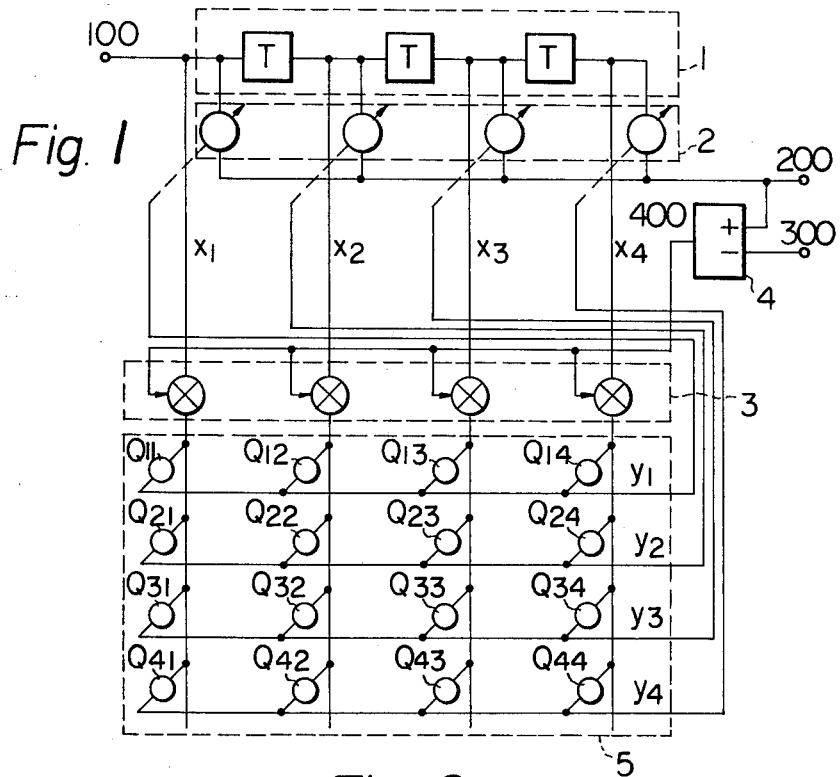
FIGS. 1 and 2 are block-diagrams of the prior automatic equalizers.
Figure 2:
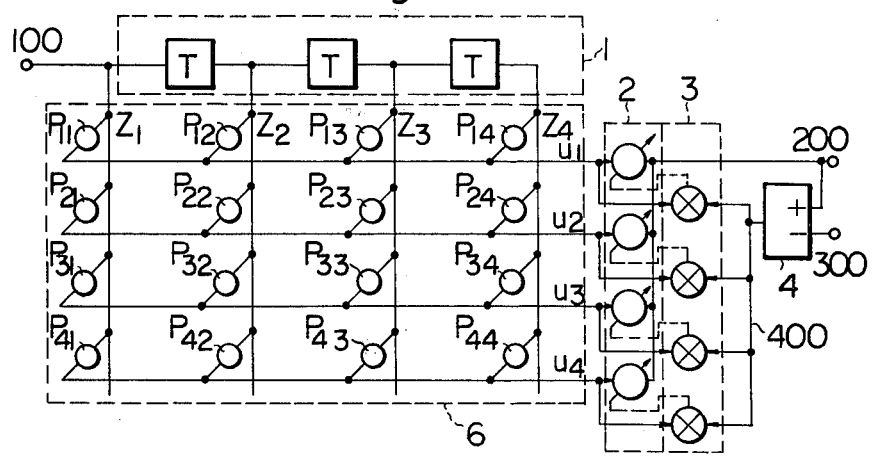

First, a prior automatic equalizer is explained, with reference to FIGS. 1 and 2, for the sake of an easier understanding of the present invention.

FIG. 1 is a block-diagram of the prior automatic equalizer which has a coefficient matrix in the error signal unit and FIG. 2 is a block-diagram of the prior automatic equalizer which has the coefficient matrix in the signal path. For simplicity in the explanation, it is assumed in the following description that the equalizer has four delay taps. In FIGS. 1 and 2, the reference numeral 1 is a delay element train, 2 is a group of variable coefficient units, 3 is a group of multipliers, 4 is a comparator, 5 is a Q-coefficient matrix and 6 is a P-coefficient matrix. 100 is an input terminal, 200 is an output terminal, 300 is a terminal for receiving a correct signal and 400 is a terminal for providing an error signal. Although the operation of the equalizer shown in FIGS. 1 and 2 is well-known, the operation is briefly explained for the sake of the explanation of the present invention.

FIG. 1 is an automatic equalizer which has a coefficient matrix in an error signal path. The input signal from the input terminal 100 is sent to the output terminal 200 through a delay element train 1, each element of which delays the signal by the same time as the unit period of the input signal, and the group of variable coefficient units 2. The comparator 4 provides the difference between the output signal at the terminal 200 and the correct signal from the terminal 300, and the difference signal or the error signal appears at the terminal 400. The group of multipliers 3 provides the product of the error signal and each tap output of the delay element train 1. The output of the multipliers 3 is applied to the Q-coefficient matrix 5, in which a matrix computation is performed, and the output of the matrix 5 controls the group of variable coefficient units 2.

On the other hand, FIG. 2 is a prior automatic equalizer which has a coefficient matrix in a signal path. The input signal from the input terminal 100 is provided through a delay element train 1 to the P-coefficient matrix 6, the output of which is provided to the output terminal 200 through the group of variable coefficient units 2. The comparator 4 provides the difference or the error between the output signal at the terminal 200 and the correct signal from the terminal 300, at the terminal 400. The multipliers 3 provide the product of the error signal and each output of the P-coefficient matrix 6, and the output of the multipliers 3 controls the group of the variable coefficient units.

The equalizer of FIG. 2 is the same as that of FIG. 1, except for the portion where the coefficient matrix is inserted, and each element of the coefficient matrix has the value shown in the drawings. The signals $x_1 \ldots x_4$, $y_1 \ldots y_4$, $z_1 \ldots z_4$ and $u_1 \ldots u_4$ are supposed to appear at each portion shown in the figures.

In FIG. 1 and FIG. 2, the following relationship is satisfied.

$$\begin{bmatrix} y_1 \\ y_2 \\ y_3 \\ y_4 \end{bmatrix} = \begin{bmatrix} Q_{11} & Q_{12} & Q_{13} & Q_{14} \\ Q_{21} & Q_{22} & Q_{23} & Q_{24} \\ Q_{31} & Q_{32} & Q_{33} & Q_{34} \\ Q_{41} & Q_{42} & Q_{43} & Q_{44} \end{bmatrix} \begin{bmatrix} x_1 \\ x_2 \\ x_3 \\ x_4 \end{bmatrix} \quad (1)$$

$$\begin{bmatrix} u_1 \\ u_2 \\ u_3 \\ u_4 \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \\ P_{41} & P_{42} & P_{43} & P_{44} \end{bmatrix} \begin{bmatrix} z_1 \\ z_2 \\ z_3 \\ z_4 \end{bmatrix} \quad (2)$$

The condition that the operation of the apparatus of FIG. 1 is the same as that of FIG. 2 has been known that $$Q = P'P \quad (3)$$

wherein P' is the transposed matrix of the matrix P.

Generally speaking, the Q-matrix has the symmetrical elements concerning both of the diagonal lines, that is to say, $Q_{11}=Q_{44}$, $Q_{12}=Q_{43}$, etc., are satisfied, and the Q-matrix is as follows.

$$\begin{bmatrix} Q_{11} & Q_{12} & Q_{13} & Q_{14} \\ Q_{21} & Q_{22} & Q_{23} & Q_{24} \\ Q_{24} & Q_{23} & Q_{22} & Q_{21} \\ Q_{14} & Q_{13} & Q_{12} & Q_{11} \end{bmatrix} \quad (4)$$

It should be noted that in the above matrix the number of kinds of elements is reduced to 50% of the original matrix. The matrix (4) can be changed to the following matrix (5).

$$\begin{bmatrix} \begin{bmatrix} Q_{11} & Q_{12} \\ Q_{21} & Q_{22} \end{bmatrix} & \vdots & \begin{bmatrix} Q_{14} & Q_{13} \\ Q_{24} & Q_{23} \end{bmatrix} \begin{bmatrix} 0 & 1 \\ 1 & 0 \end{bmatrix} \\ \hline \begin{bmatrix} 0 & 1 \\ 1 & 0 \end{bmatrix} \begin{bmatrix} Q_{14} & Q_{13} \\ Q_{24} & Q_{23} \end{bmatrix} & \vdots & \begin{bmatrix} 0 & 1 \\ 1 & 0 \end{bmatrix} \begin{bmatrix} Q_{11} & Q_{12} \\ Q_{21} & Q_{22} \end{bmatrix} \begin{bmatrix} 0 & 1 \\ 1 & 0 \end{bmatrix} \end{bmatrix} \quad (5)$$

And the matrix (5) is the same as the following matrix (6).

$$\begin{bmatrix} A & BH \\ HB & HA'H \end{bmatrix} \quad (6)$$

where $$A = \begin{bmatrix} Q_{11} & Q_{12} \\ Q_{21} & Q_{22} \end{bmatrix} \quad (7)$$

$$B = \begin{bmatrix} Q_{14} & Q_{13} \\ Q_{24} & Q_{23} \end{bmatrix} \quad (8)$$

$$H = \begin{bmatrix} 0 & 1 \\ 1 & 0 \end{bmatrix} \quad (9)$$

It should be noted that the multiplication of a matrix and H-matrix (9) from the right has the same effect as symmetrically changing the right columns and the left columns of the original matrix, and the multiplication of H-matrix (9) from the left has the same effect as symmetrically changing the upper rows and the lower rows of the original matrix.

Next, the characteristics of P-matrix which satisfies the equation (3) is considered. The conclusion that P-matrix must satisfy is the equation (10).

$$P = \begin{bmatrix} P_{11} & P_{12} & P_{13} & P_{14} \\ P_{21} & P_{22} & P_{23} & P_{24} \\ P_{14} & P_{13} & P_{12} & P_{11} \\ P_{24} & P_{23} & P_{22} & P_{21} \end{bmatrix} \quad (10)$$

It should be noted in the equation (10) that the third row ($P_{14}, P_{13}, P_{12}, P_{11}$) is the symmetrical transposition of the first row ($P_{11}, P_{12}, P_{13}, P_{14}$), and the fourth row ($P_{24}, P_{23}, P_{22}, P_{21}$) is the symmetrical transposition of the second row ($P_{21}, P_{22}, P_{23}, P_{24}$). The above matters will be proved below.

The matrix (10) is the same as the following matrix (11), which can be re-written to the matrix (12).

$$P = \begin{bmatrix} \begin{bmatrix} P_{11} & P_{12} \\ P_{21} & P_{22} \end{bmatrix} & \vdots & \begin{bmatrix} P_{13} & P_{14} \\ P_{23} & P_{24} \end{bmatrix} \\ \hline \begin{bmatrix} P_{13} & P_{14} \\ P_{23} & P_{24} \end{bmatrix} \begin{bmatrix} 0 & 1 \\ 1 & 0 \end{bmatrix} & \vdots & \begin{bmatrix} P_{11} & P_{12} \\ P_{21} & P_{22} \end{bmatrix} \begin{bmatrix} 0 & 1 \\ 1 & 0 \end{bmatrix} \end{bmatrix} \quad (11)$$

$$P = \begin{bmatrix} \alpha & \beta \\ \beta H & \alpha H \end{bmatrix} \quad (12)$$

where, $$\alpha = \begin{bmatrix} P_{11} & P_{12} \\ P_{21} & P_{22} \end{bmatrix} \quad (13)$$

$$\beta = \begin{bmatrix} P_{13} & P_{14} \\ P_{23} & P_{24} \end{bmatrix} \quad (14)$$

The product $P'P$, on the condition that the P-matrix is given by the equation (12), is as follows.

$$P'P = \begin{bmatrix} \alpha'\alpha + H\beta'\beta H, & \alpha'\beta + H\beta'\alpha H \\ \beta'\alpha + H\alpha'\beta H, & \beta'\beta + H\alpha'\alpha H \end{bmatrix} \quad (15)$$

It should be noted that the equation (15) satisfies the equation (6) if A and B are as follows.

$$A = \alpha'\alpha + H\beta'\beta H \quad 16$$

$$B = \alpha'\beta H + H\beta'\alpha \quad 17$$

The matrix P'P in which the matrix P is given by the equation (10) has the point of symmetry at the center of the matrix and, when the equations (16) and (17) are satisfied, the matrix Q in FIG. 1 is equivalent to the matrix P in FIG. 2. As explained above, it has been clear that the Q matrix in the equation (4) is completely the same as the P matrix in the equation (10).

The intent of the present invention is to reduce the calculation steps of the matrix P and/or Q to fifty percent of the steps in the prior art.

The P matrix in the equation (10) can be changed to the following equation (18), and the matrix (12) can be changed to the matrix (19) below.

$$P_s = \begin{bmatrix} P_{11} - P_{14}, & P_{12} - P_{13}, & P_{13} - P_{12}, & P_{14} - P_{11} \\ P_{21} - P_{24}, & P_{22} - P_{23}, & P_{23} - P_{22}, & P_{24} - P_{21} \\ P_{11} + P_{14}, & P_{12} + P_{13}, & P_{13} + P_{12}, & P_{14} + P_{11} \\ P_{21} + P_{24}, & P_{22} + P_{23}, & P_{23} + P_{22}, & P_{24} + P_{21} \end{bmatrix} \quad (18)$$

$$P_s = \begin{bmatrix} \alpha - \beta H, & \beta - \alpha H \\ \alpha + \beta H, & \beta + \alpha H \end{bmatrix} \quad (19)$$

The upper half elements of the matrix P in (18) perform the portion of the odd function of the transfer function of the equalizer, and the lower half elements of the matrix P in (18) perform the portion of the even function of the transfer function of the equalizer. The equation (19) can be obtained by dividing the matrix (12) into the odd function and the even function.

The present invention relies on the fact that the matrix (10) or (12) can be changed to the equivalent matrix (18), which can be, in turn, changed to the further $$P_s = \begin{bmatrix} P_{11} - P_{14}, & P_{12} - P_{13}, & 0, & 0 \\ P_{21} - P_{24}, & P_{22} - P_{23}, & 0, & 0 \\ 0, & 0, & P_{11} + P_{14}, & P_{12} + P_{13} \\ 0, & 0, & P_{21} + P_{24}, & P_{22} + P_{23} \end{bmatrix} \begin{bmatrix} 1 & 0 & 0 & -1 \\ 0 & 1 & -1 & 0 \\ 1 & 0 & 0 & 1 \\ 0 & 1 & 1 & 0 \end{bmatrix} \quad (20)$$

Figure 3:
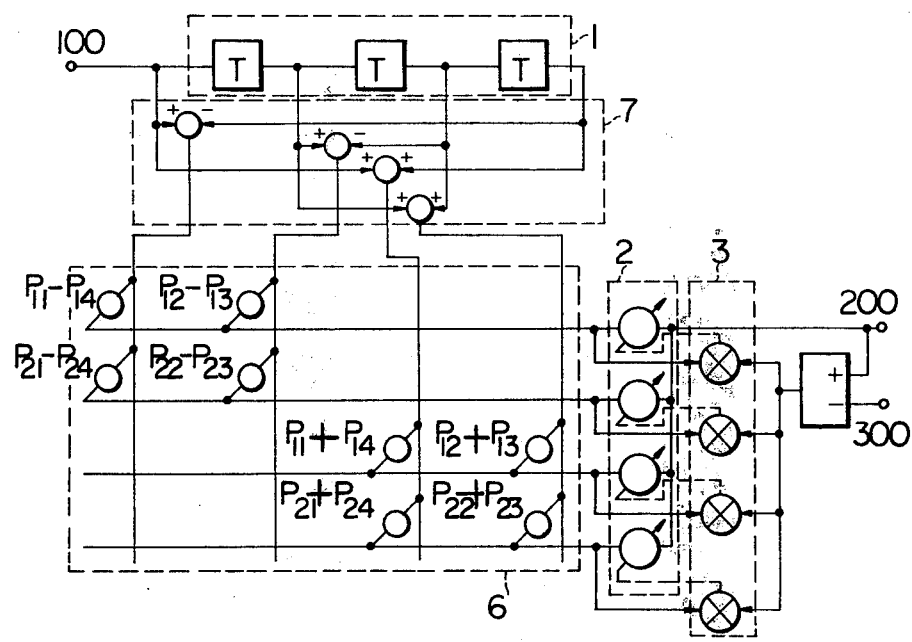
FIG. 3 is a block-diagram of the automatic equalizer according to the present invention.

When the matrix P is expressed by the equivalent matrix $P_s$ in the equation (20), the configuration of the equalizer in FIG. 2 is changed to that in FIG. 3, which is the block-diagram of the automatic equalizer according to the present invention. It is a matter of course that $P_{31} = P_{14}$, $P_{32} = P_{13}$, etc., are satisfied in FIG. 2 as mentioned before in relation to the equation (10). It should be appreciated that the number of elements in the P matrix in FIG. 3 is only half of that in FIG. 2.

On the other hand, the simplified matrix for FIG. 1 can be obtained by $P_s' P_s$, which is the product of the matrix $P_s$ in (20) and the transposition of matrix $P_s'$ from the left, as shown in the following equation (21).

$$P_s' P_s = \begin{bmatrix} 1 & 0 & 1 & 0 \\ 0 & 1 & 0 & 1 \\ 0 & -1 & 0 & 1 \\ -1 & 0 & 1 & 0 \end{bmatrix} \begin{bmatrix} r & 0 \\ 0 & s \end{bmatrix} \begin{bmatrix} r & 0 \\ 0 & s \end{bmatrix} \begin{bmatrix} 1 & 0 & 0 & -1 \\ 0 & 1 & -1 & 0 \\ 1 & 0 & 0 & 1 \\ 0 & 1 & 1 & 0 \end{bmatrix} \quad (21)$$

$$= \begin{bmatrix} 1 & 0 & 1 & 0 \\ 0 & 1 & 0 & 1 \\ 0 & -1 & 0 & 1 \\ -1 & 0 & 1 & 0 \end{bmatrix} \begin{bmatrix} r'r & 0 \\ 0 & s's \end{bmatrix} \begin{bmatrix} 1 & 0 & 0 & -1 \\ 0 & 1 & -1 & 0 \\ 1 & 0 & 0 & 1 \\ 0 & 1 & 1 & 0 \end{bmatrix}$$

where $$\begin{bmatrix} P_{11} - P_{14}, & P_{12} - P_{13} \\ P_{21} - P_{24}, & P_{22} - P_{23} \end{bmatrix} = r$$

$$\begin{bmatrix} P_{11} + P_{14}, & P_{12} + P_{13} \\ P_{21} + P_{24}, & P_{22} + P_{23} \end{bmatrix} = s$$

It should be noted that half of the elements in the matrix in the equation (21) are zero, so the circuit configuration for computing the matrix can be simplified. Thus the equalizer in FIG. 1 can be changed to the equivalent equalizer in FIG. 4, which is the second embodiment of the present invention and has a coefficient matrix in the error signal path.

Figure 4:
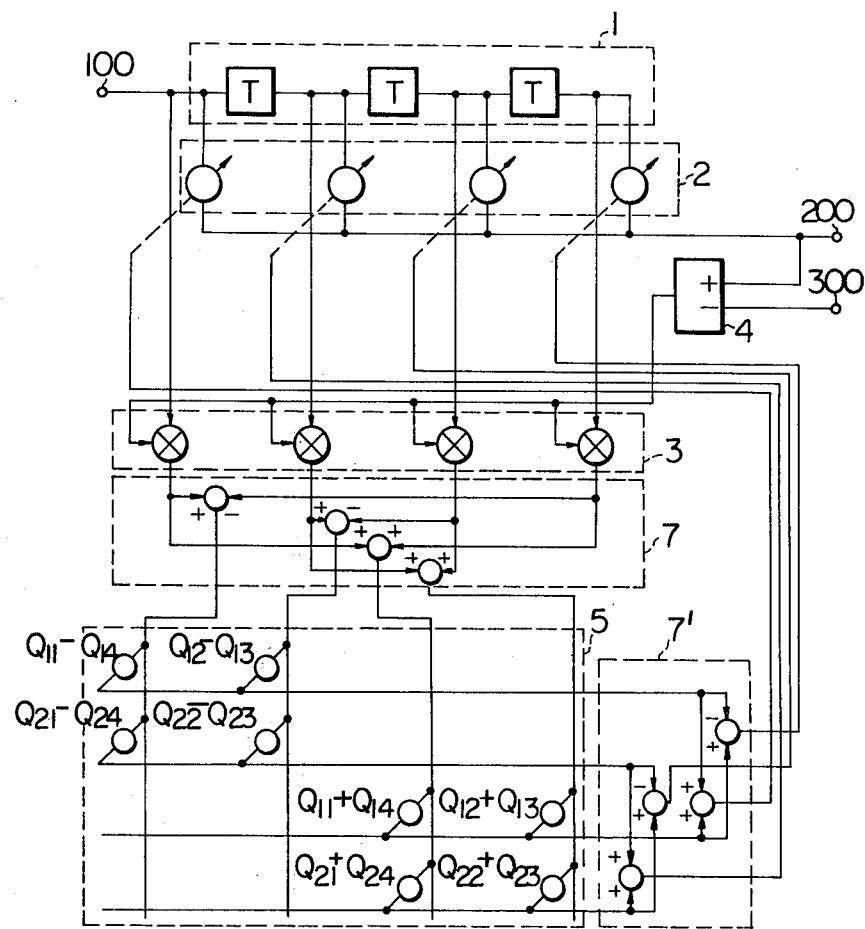
FIG. 4 is a block-diagram of another embodiment of the automatic equalizer according to the present invention.

The operation of the equilizer in FIG. 3 and FIG. 4 is the same as that in FIG. 2 and FIG. 1, respectively, except an adder 7 is introduced for the addition and/or the substraction of the signal in FIG. 3 and FIG. 4. It should be noted that in the P matrix 6 in FIG. 3 and the Q matrix 5 in FIG. 4, the first column and the third column are the difference and the sum of the first column and the fourth column, respectively, of the matrix (10) and (4), respectively, and; the second column and the fourth column are the difference and the sum of the second column and the third column, respectively, of the same.

Figure 5:
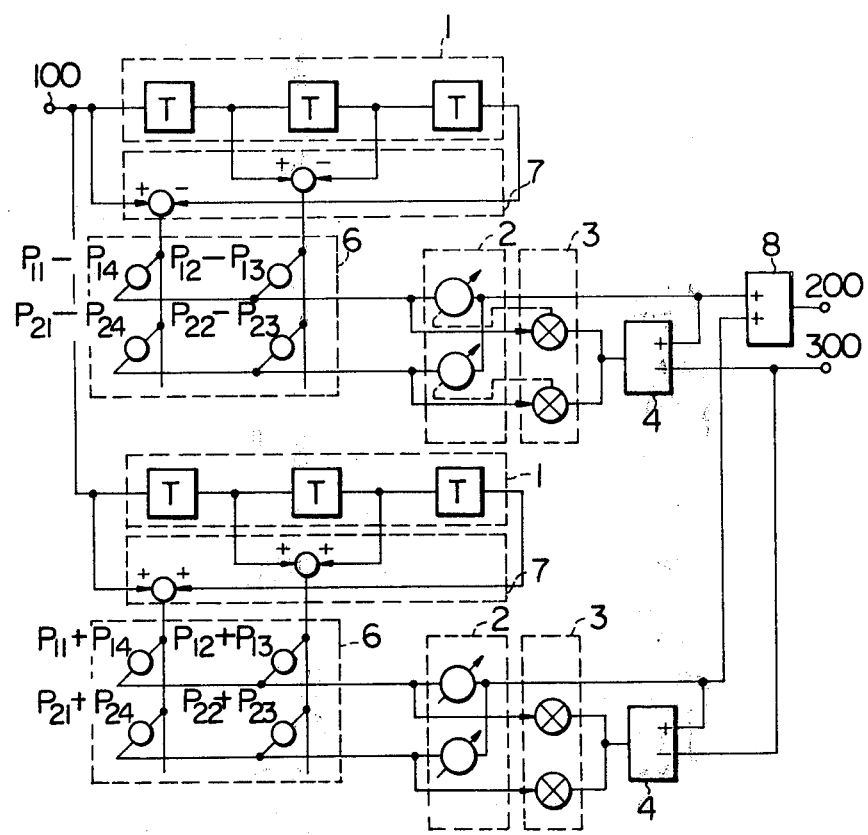
FIG. 5 is a block-diagram of still another embodiment of the automatic equalizer according to the present invention.
Figure 6:
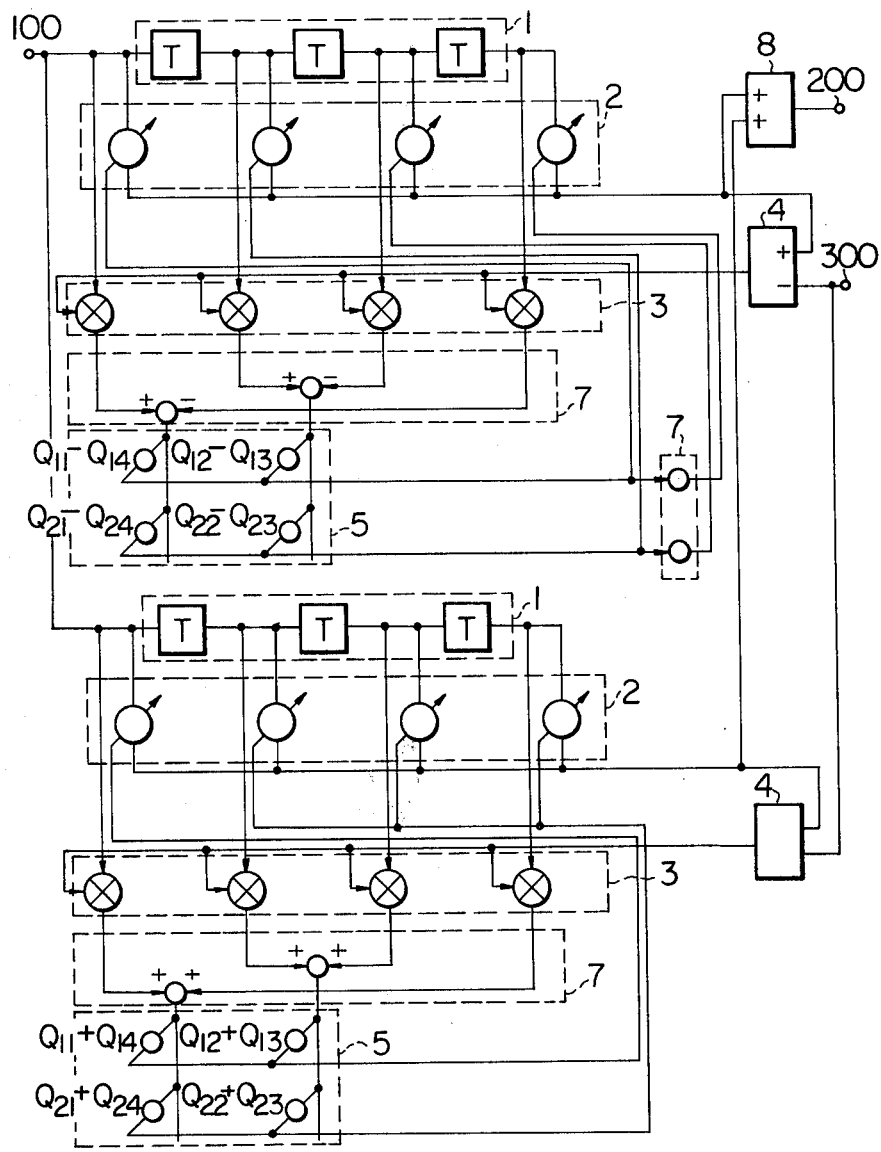
FIG. 6 is a block-diagram of a still another embodiment of the automatic equalizer according to the present invention.

FIG. 5 and FIG. 6 are another embodiment of the present invention, in which the matrix is divided to two matrixes having the substraction part and the addition part respectively. The equalizer in FIG. 5 has the coefficient matrix in the signal path, and the equalizer in FIG. 6 has the same in the error signal path. In FIGS. 5 and 6, the reference numeral 8 indicates an adder.

As explained above in detail, the present automatic equalizer has the advantage that the structure of the equalizer can be simplified since the number of elements in the matrix is reduced to half that of the prior art. Although the embodiments disclosed here have four taps in a delay train, it should be understood, of course, that the present invention can be applied to an equilizer having an arbitrary number of taps in a delay train.

From the foregoing it will now be apparent that a new and improved automatic equalizer has been found. It should be understood, of course, that the embodiments disclosed are merely illustrative and are not intended to limit the scope of the invention. Reference should be made to the appended claims, therefore, rather than the specification, as indicating the scope of the invention.

What is claimed is:

1. An automatic equalizer comprising a delay element train having a plurality of taps, one end of said train being connected to an input terminal, a coefficient matrix circuit having a symmetrical placement of elements which operate on each of the signals obtained from each tap of said delay element train through a plurality of adders and subtractors, multipliers providing a product of each tap output of a group of variable coefficient and an error signal between the output signal and the reference signal, a group of variable coefficient units controlled by said coefficient matrix circuit for providing an equalized output signal, a plurality of adders and subtractors provided at the input of said coefficient matrix circuit for adding pairs of signals to each other and subtracting pairs of signals from each other, said pairs of signals being obtained from outputs of taps of said delay element train.

2. An automatic equalizer according to claim 1, wherein the number of taps of the delay element train is four.

3. An automatic equalizer according to claim 2, wherein the coefficient matrix is $$P_s = \begin{bmatrix} P_{11} - P_{14}, & P_{12} - P_{13}, & 0, & 0 \\ P_{21} - P_{24}, & P_{22} - P_{23}, & 0, & 0 \\ 0, & 0, & P_{11} + P_{14}, & P_{12} + P_{13} \\ 0, & 0, & P_{21} + P_{24}, & P_{22} + P_{23} \end{bmatrix}$$

where $P_{ij}$ ($i = 1, 2$, $j = 1, 2, 3, 4$) are scalar and can be arbitrarily chosen, and $P_s$ is $4 \times 4$ matrix.

4. An automatic equalizer comprising a delay element train having a plurality of taps, one end of said train being connected to an input terminal, a coefficient matrix circuit having a symmetrical placement of elements which operate on each of the signals obtained from each tap of said delay element train through a plurality of multipliers and adders and subtractors, said multipliers providing a product of each tap output of said train and an error signal between the output signal and the reference signal, a group of variable coefficient units controlled by said coefficient matrix circuit through a plurality of adders and subtractors, for providing an equalized output signal, a plurality of adders and subtractors provided at the input of said coefficient matrix circuit for adding pairs of signals to each other and subtracting pairs of signals from each other, said pairs of signals being obtained from outputs of taps situated symmetrically at said delay element train through said multipliers, a plurality of adders and subtractors provided at the output of said coefficient matrix circuit, said adders and subtractors comprising a transposed matrix of the matrix comprising the adders and subtractors at the input of said coefficient matrix circuit.

5. An automatic equalizer according to claim 4, wherein the number of taps of the delay element train is four.

6. An automatic equalizer according to claim 5, wherein the coefficient matrix is $$\begin{bmatrix} r'r & 0 \\ 0 & s's \end{bmatrix}$$

where $$r = \begin{bmatrix} P_{11} - P_{14} & P_{12} - P_{13} \\ P_{21} - P_{24} & P_{22} - P_{23} \end{bmatrix}$$

$$s = \begin{bmatrix} P_{11} + P_{14} & P_{12} + P_{13} \\ P_{21} + P_{24} & P_{22} + P_{23} \end{bmatrix}$$

$r'$ and $s'$ being the transposed matrixes of $r$ and $s$ respectively, where $P_{ij}(i=1,2, j=1,2,3,4)$ are scalar, $r$ and $s$ are $(2 = 2)$ matrixes.

* * * * *